United States Patent
Chitalwala et al.

(10) Patent No.: US 12,050,939 B2
(45) Date of Patent: Jul. 30, 2024

(54) SYSTEM FOR MONITORING AND OPTIMIZING COMPUTING RESOURCE USAGE OF CLOUD BASED COMPUTING APPLICATION

(71) Applicant: Accenture Global Solutions Limited, Dublin (IE)

(72) Inventors: Murtuza Chitalwala, Mumbai (IN); Anuruddha S. Khastgir, Mumbai (IN); Jagaran Das, Durgapur (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 316 days.

(21) Appl. No.: 17/395,994

(22) Filed: Aug. 6, 2021

(65) Prior Publication Data
US 2023/0043579 A1 Feb. 9, 2023

(51) Int. Cl.
*G06F 9/50* (2006.01)
*G06F 9/48* (2006.01)
*G06F 11/34* (2006.01)

(52) U.S. Cl.
CPC .......... *G06F 9/5083* (2013.01); *G06F 9/4887* (2013.01); *G06F 9/5038* (2013.01);
(Continued)

(58) Field of Classification Search
CPC ... G06F 9/50–5083; G06F 11/34–3466; G06F 2209/501; G06F 2209/508
See application file for complete search history.

(56) References Cited

U.S. PATENT DOCUMENTS

| | | | |
|---|---|---|---|
| 7,757,214 B1* | 7/2010 | Palczak | G06F 9/5083 717/121 |
| 2015/0150020 A1* | 5/2015 | Duttagupta | G06N 5/048 718/104 |

(Continued)

OTHER PUBLICATIONS

AI based Performance Benchmarking & Analysis of Big Data and Cloud Powered Applications Jayanti Vemulapati, Anuruddha S. Khastgir, Chethana Savalgi (Year: 2019).*

(Continued)

*Primary Examiner* — Emerson C Puente
*Assistant Examiner* — Paul V Mills
(74) *Attorney, Agent, or Firm* — Polsinelli PC (57) ABSTRACT

A system of monitoring and optimizing computing resources usage for computing application may include predicting a first performance metric for job load capacity of a computing application for optimal job concurrency and optimal resource utilization. The system may include generating an alerting threshold based on the first performance metric. The system may further include, in response to a difference between the alerting threshold and a job load of the computing application within an interval exceeding a threshold, predicting a second performance metric for job load capacity of the computing application for optimal job concurrency and optimal resource utilization. The system may further include, in response to a difference between the first performance metric and the second performance metric exceeding a difference threshold, updating the alerting threshold with a job load capacity with the optimal resource utilization rate corresponding to the second performance metric.

14 Claims, 6 Drawing Sheets

(52) U.S. Cl.
CPC ............ *G06F 9/505* (2013.01); *G06F 9/5055* (2013.01); *G06F 9/5072* (2013.01); *G06F 9/5077* (2013.01); *G06F 11/3433* (2013.01); *G06F 2209/501* (2013.01); *G06F 2209/508* (2013.01)

(56) References Cited

U.S. PATENT DOCUMENTS

| | | | | |
|---|---|---|---|---|
| 2017/0046254 | A1* | 2/2017 | Buege | G06F 11/3684 |
| 2017/0220407 | A1* | 8/2017 | Estrada | G06F 11/3495 |
| 2017/0220944 | A1* | 8/2017 | Nghiem | G06F 9/5066 |
| 2018/0217912 | A1* | 8/2018 | Demeilliez | G05B 23/0221 |
| 2020/0099773 | A1* | 3/2020 | Myers | H04L 67/34 |
| 2021/0004357 | A1* | 1/2021 | Bagchi | G06F 16/217 |
| 2021/0019211 | A1* | 1/2021 | Sghiouer | G06F 11/079 |
| 2021/0064492 | A1* | 3/2021 | Myers | G06F 11/34 |
| 2021/0067406 | A1* | 3/2021 | Myers | G06F 11/3409 |
| 2021/0081298 | A1* | 3/2021 | Gardner | G06F 11/3452 |
| 2021/0089438 | A1* | 3/2021 | Gardner | G06F 11/3688 |

OTHER PUBLICATIONS

MTune: Auto-Tuned Threading for OLDI Microservices Akshitha Sriraman Thomas F. Wenisch (Year: 2018).*

Efficient Deep Neural Network Serving: Fast and Furious Feng Yan, Yuxiong He, Olatunji Ruwase and Evgenia Smirni (Year: 2018).*

Parallelism Orchestration using DoPE: the Degree of Parallelism Executive Arun Raman Hanjun Kim Taewook Oh Jae Lee David I. August (Year: 2011).*

Autoadmin: Automatic and Dynamic Resource Reservation Admission Control in Hadoop Yarn Clusters Zhengyu Yang, Janki Bhimani, Yi Yao, Cho-Hsien Lin, Jiayin Wang†, Ningfang Mi, and Bo Sheng (Year: 2018).*

Using machine learning to optimize parallelism in big data applications Álvaro Brandón Hernández, María S. Perez, Smrati Gupta, Victor Muntés-Mulero (Year: 2017).*

AutomatedWorkload Management for Enterprise Data Warehouses Abhay Mehta Chetan Gupta Song Wang Umeshwar Dayal (Year: 2008).*

Adaptive Parallelism Mapping in Dynamic Environments using Machine Learning Murali Emani (Year: 2014).*

Cloud Computing, Wikipedia, https://en.wikipedia.org/wiki/Cloud_computing, 25 pages, accessed and printed Aug. 4, 2021.

Load Testing, Wikipedia, https://en.wikipedia.org/wiki/Load_testing, 7 pages, accessed and printed Aug. 4, 2021.

Software performance testing, Wikipedia, https://en.wikipedia.org/wiki/Software_performance_testing.

Office Action issued on Canadian application 3161221 on Nov. 29, 2023, 3 pages.

* cited by examiner

SYSTEM FOR MONITORING AND OPTIMIZING COMPUTING RESOURCE USAGE OF CLOUD BASED COMPUTING APPLICATION

TECHNICAL FIELD

This disclosure relates to cloud based computing application, in particular, to monitoring and optimizing computing resource usage of the cloud based computing application.

BACKGROUND

In a cloud based computing application, such as Apache™ Hadoop®, data warehouse, SQL database, and analytics & visualization tools, it is commonly observed through monitoring tools that over a period, the number of jobs submitted on ad hoc basis in combination with the number of jobs scheduled within a specified interval may grow high as the demand for running more jobs increases as per business requirement. It is a traditional practice for businesses to reactively allocate more computing resources to the computing application when overall degradation in performance of the computing application is detected either via user experience or because resource consumption goes beyond a predefined threshold.

SUMMARY

This disclosure relates to systems and methods for monitoring and optimizing computing resource usage of an cloud based computing application.

In one embodiment, a method for monitoring and optimizing computing resource usage of a computing application is disclosed. The method may include predicting, with artificial intelligence executed by a processor circuitry, a first performance metric for job load capacity of a computing application for optimal job concurrency and optimal resource utilization. The job load capacity may be a combination of jobs being concurrently executed by the computing application and jobs pending for execution by the computing application. The method may further include generating, with the processor circuitry, an alerting threshold based on the first performance metric. The alerting threshold may represent a job load capacity with the optimal resource utilization rate corresponding to the first performance metric. The method may include, in response to a difference between the alerting threshold and a job load of the computing application within an interval exceeding a load difference threshold, predicting, with the artificial intelligence executed by the processor circuitry, a second performance metric for job load capacity of the computing application for optimal job concurrency and optimal resource utilization. The second performance metric may be predicted by the artificial intelligence based on historical job load data and historical resource utilization tracking data. The method may further include, in response to a difference between the first performance metric and the second performance metric exceeding a predetermined difference threshold, updating the alerting threshold with a job load capacity with the optimal resource utilization rate corresponding to the second performance metric.

In another embodiment, a system for monitoring and optimizing computing resource usage of a computing application is disclosed. The system may include a memory having stored thereon executable instructions and a processor in communication with the memory. When executing the instructions, the processor may be configured to predict a first performance metric for job load capacity of a computing application for optimal job concurrency and optimal resource utilization. The job load capacity may be a combination of jobs being concurrently executed by the computing application and jobs pending for execution by the computing application. The processor may further be configured to generate an alerting threshold based on the first performance metric. The alerting threshold may represent a job load capacity with an optimal resource utilization rate corresponding to the first performance metric. The processor may further be configured to, in response to a difference between the alerting threshold and a job load of the computing application within an interval exceeding a load difference threshold, predict a second performance metric for job load capacity of the computing application for optimal job concurrency and optimal resource utilization based on historical job load data and historical resource utilization tracking data. The processor may further be configured to, in response to a difference between the first performance metric and the second performance metric exceeding a predetermined difference threshold, update the alerting threshold with a job load capacity with the optimal resource utilization rate corresponding to the second performance metric.

In another embodiment, a product for monitoring and optimizing computing resource usage of a computing application is disclosed. The product may include machine-readable media other than a transitory signal and instructions stored on the machine-readable media. When being executed, the instructions may be configured to cause a processor to predict a first performance metric for job load capacity of a computing application for optimal job concurrency and optimal resource utilization. The job load capacity may be a combination of jobs being concurrently executed by the computing application and jobs pending for execution by the computing application. The instructions may further be configured to cause the processor to generate an alerting threshold based on the first performance metric. The alerting threshold may represent a job load capacity with the optimal resource utilization rate corresponding to the first performance metric. The instructions may further be configured to cause the processor to, in response to a difference between the alerting threshold and a job load of the computing application within an interval exceeding a load difference threshold, predict a second performance metric for job load capacity of the computing application for optimal job concurrency and optimal resource utilization based on historical job load data and historical resource utilization tracking data. The instructions may further be configured to cause the processor to, in response to a difference between the first performance metric and the second performance metric exceeding a predetermined difference threshold, update the alerting threshold with a job load capacity with the optimal resource utilization rate corresponding to the second performance metric.

One interesting feature of the systems and methods described below may be that it may dynamically determine and implement an optimal job load capacity for the computing application where both an optimal job concurrency and an optimal computing resource utilization are achieved. The job concurrency may represent the number of jobs being concurrently executed by the computing application. In other words, a highest job concurrency is achieved without sacrificing the desirable computing resource utilization rate. When the computing application is working on the optimal job load capacity, the optimal job concurrency and the optimal resource utilization may be warranted. For example, the method may introduce a performance metric for job load capacity of the computing application for optimal job concurrency and optimal resource utilization. The performance metric may be formulated taking into account of parameters of job load on the computing application, jobs concurrently running on the computing application, jobs pending for execution by the computing application, and computing resource utilization of the computing application. As such, the maximum value of the performance metric may indicate the optimal job load capacity where both the optimal job concurrency and the optimal resource utilization are achieved. Additionally, the optimal job load capacity for the computing application may be subject to the change to the amount of computing resources allocated to the computing resources. By continuously monitoring whether the resource utilization of the computing application meets the optimal resource utilization, the method may dynamically determine a new maximum value of the performance metric based on the newly generated job load data and computing resource utilization tracking data, and update the optimal job load capacity for the computing application with the job load capacity corresponding to the new maximum performance metric.

The above embodiments and other aspects and alternatives of their implementations are explained in greater detail in the drawings, the descriptions, and the claims.

BRIEF DESCRIPTION OF THE DRAWINGS

The present disclosure may be better understood with reference to the following drawings and description. The components in the figures are not necessarily to scale. Moreover, in the figures, like-referenced numerals designate corresponding parts throughout the different views.

DETAILED DESCRIPTION

When making use of a cloud-based computing application to run jobs, the users may keep submitting or scheduling new jobs to their respective queues that may critically increase job load on a cluster within specified time intervals. The cluster may refer to a collection of virtual machines (VMs) hosting the computing application. The job may represent an instance of a user process running as a uniquely identifiable unit of task defined within the computing application that causes resource consumption. For example, a job may include a SQL query, a MapReduce process, a Spark job, an extract, transform, and load (ETL) process, a machine/deep learning process, a data import/export, or Python scripts. Accordingly, the job load may represent, for example, workload due to queries, batch processes, executable scripts, and different kinds of workload depending on the kind of the computing application. The different kinds of workload may include, for example, MapReduce or Spark jobs, Hive queries, Python scripts, machine learning algorithms, disk maintenance routines, and the like.

Normally, the users would not be aware of or concerned with the cluster capacity constraints while submitting/scheduling new jobs for the following reasons: (1) jobs may not be critical or adhered to meet Service Level Agreements (SLAs) obligations and the users may accept that the jobs would take more time than their average processing time, waiting in the queue for resources to be allocated, and (2) the users may presume there are adequate resources available to get the jobs processed within their defined SLAs.

Computing resources may include various resources such as memory and CPU vCores that are available for execution and computation of user processes or jobs in a single VM or a collection of VMs on cloud that a computing application needs to support its operation. The tools for monitoring resource usage of the computing application may typically measure the resource utilization, like central processing unit (CPU), memory, hard disk, or network input/output (I/O) used against a predetermined threshold. Whenever there is an overutilization, the tools may trigger alerts to prevent the users from adding further job load to the application. In another example, the monitoring tools may be configured to record the number of running jobs every 5, 10 or 15 minutes and trigger an alert when the rate of increase in number of running jobs exceeds a predetermined threshold in the last 5, 10, or 15 minutes.

However, these monitoring tools may have three disadvantages. First, the predetermined thresholds are often fixed and empirically chosen. Second, such monitoring does not tell anything about the impact of sudden increase in the number of concurrently running jobs on the performance of the computing application and the utilization of resources allocated to the computing application. Third, it does not take into account the impact of the number of the jobs pending for execution on the resource utilization of the computing application.

Figure 1:
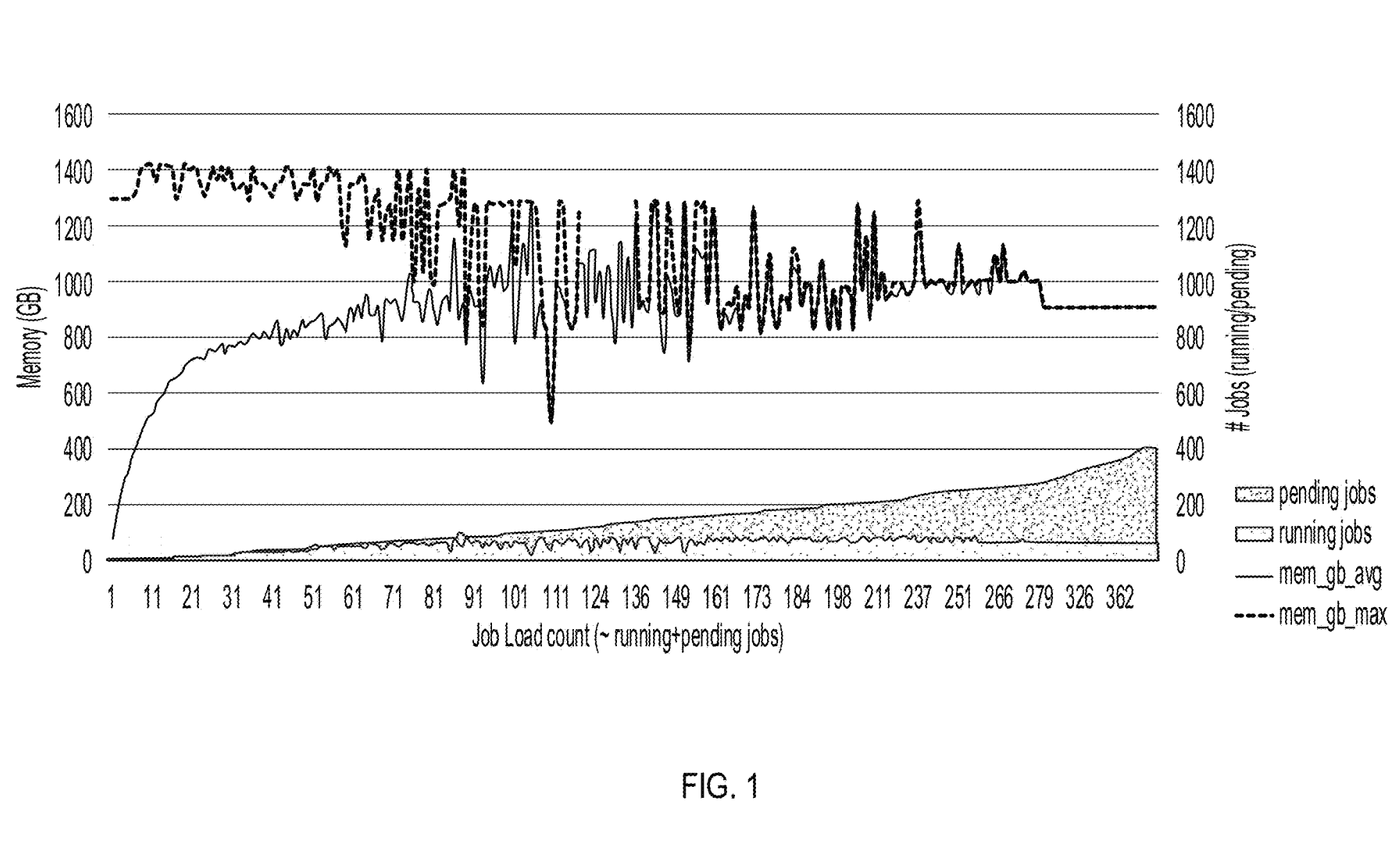
FIG. 1 is a chart schematically illustrating an example correlation between jobs pending for execution by the computing application and computing resource utilization of the computing application

Typically, a benchmark guideline for the computing application designates a maximum job concurrency, i.e., the maximum number of jobs being concurrently executed that must be supported by the initial capacity of the computing resources allocated to the computing application. As such, while the job load on the computing application increases, the job concurrency would not go up beyond the concurrency constraint as provided in the benchmark guideline. It is generally presumed that the job concurrency is positively correlated with the resource utilization. In other words, with the increase of job concurrency to the designated maximum job concurrency, the computing application would necessarily reach the highest resource utilization rate of the computing resources. However, this may be a misconception. The inventors observe that while the number of concurrently running jobs and pending jobs within a specified time interval exceeds beyond a threshold, there is a pattern of consistent decrease on resource utilization. Referring to FIG. 1, with the increase of job load including concurrently running jobs and pending jobs on a computing application such as Hadoop application, there was an observable decrease of memory consumption.

Generally, there is an upper limit of job concurrency for the computing application, i.e., the number of jobs that a computing application may concurrently execute, as discussed above. As shown in FIG. 1, when the job load on the computing application initially increases, the job concurrency would increase as well. Later, when the job concurrency reaches an upper limit, the job concurrency will not increase regardless of continuously increasing job load on the computing application. Therefore, when job load grows exponentially at times, what really grows is the number of user submitted pending jobs that are accumulating and waiting for resource allocation to them. It is observed that with the increase of pending jobs accumulated over time exceeding a threshold level, the concurrently running jobs may start to obtain less amount of compute resources than they normally would obtain. In other words, the growing number of pending jobs may cause computing resource utilization of the computing application to decrease, indicating wastage of resources. This may explain why the resource utilization decrease as the job load increases beyond a threshold level. As a result, computing resources of the computing application get wasted leading to overall performance degradation.

The allocation of more computing resources such as memory to fewer jobs may lead to faster processing of the jobs than more jobs running concurrently with each getting smaller portion of computing resources. The maximum job currency may not warrant the maximum computing resource utilization. In order to maintain an optimal computing resource utilization, for example, satisfying a predetermined criteria as per SLA, a balance should be made between the job currency and the computing resource utilization. One of the features of the system is to identify an optimal job load capacity for the computing application where an optimal job currency and an optimal computing resource utilization are achieved.

Figure 2:
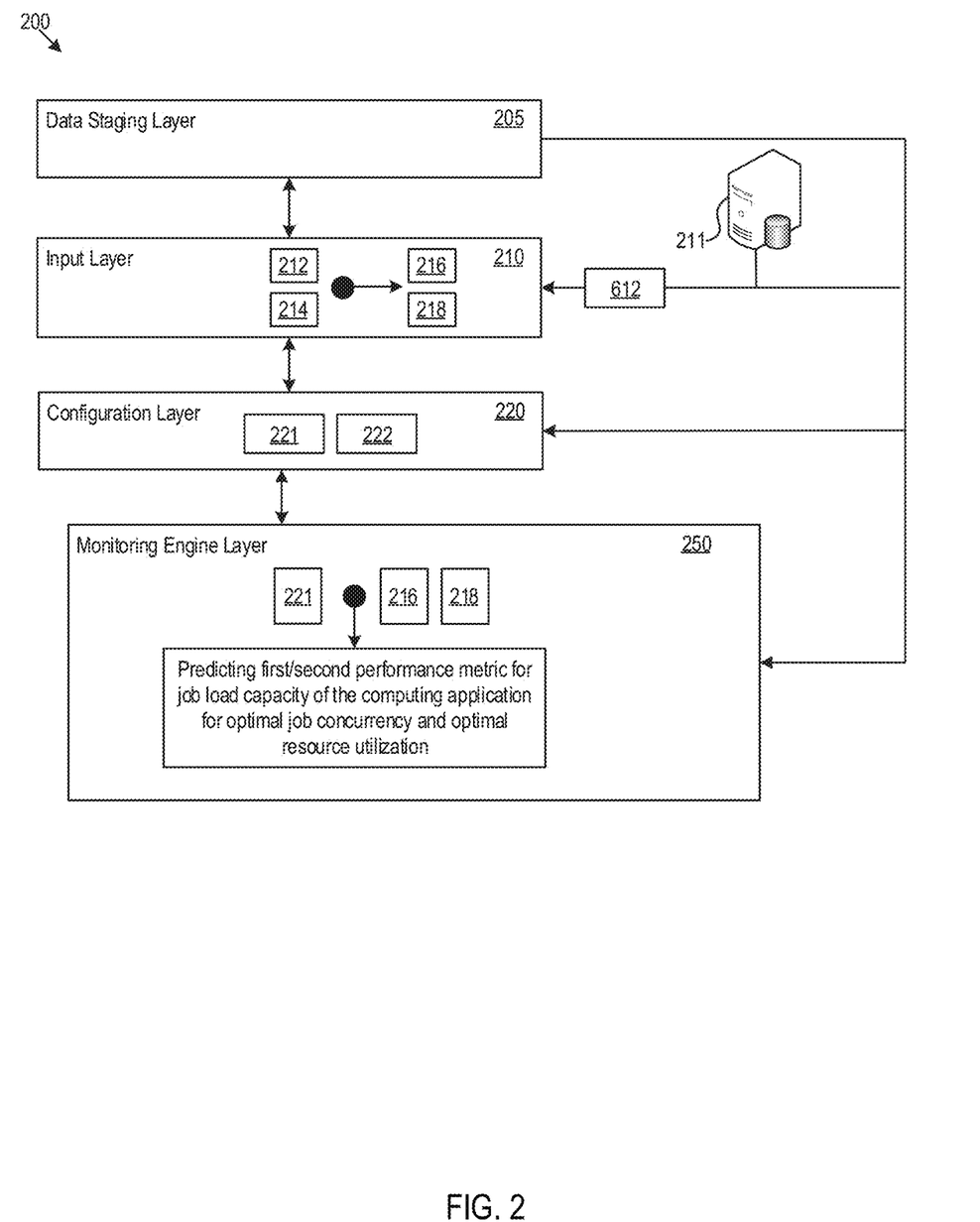
FIG. 2 shows an example multiple-layer job load optimization stack included in a system.

FIG. 2 shows an example multiple layer job load optimization (JLO) stack 200. The system described herein uses the JLO stack 200 to monitor and optimize job load capacity for the computing application based on analysis of data set associated with jobs concurrently running, jobs pending for execution, and computing resource utilization. In this example, the JLO stack 200 may include a data staging layer 205, an input layer 210, a configuration layer 220, and a monitoring engine layer 250. The JLO stack 200 may include a multiple-layer computing structure of hardware and software that may monitor and optimize the job load capacity of the computing application to accomplish both the optimal job currency and the optimal computing resource utilization.

A stack may refer to a multi-layered computer architecture that defines the interaction of software and hardware resources at the multiple layers. The Open Systems Interconnection (OSI) model is an example of a stack-type architecture. The layers of a stack may pass data and hardware resources among themselves to facilitate data processing. As one example, for the JLO stack 200, the data staging layer 205 may provide the input layer 210 with storage resources to store ingested data within a database or other data structure. In some implementations, the data staging layer 205 may be deployed as a cloud-based database platform with the capability to process mass data. In an example, an underlying Big Data Lake of the database platform is capable of ingesting data from heterogeneous data sources such as Secured Storage, Hadoop file systems (HDFS) connections, relational databases, flat files, and other data operations. Hence, the data staging layer 205 may provide a hardware resource, e.g., memory resources, to the input layer 210. Accordingly, the multiple-layer stack architecture of the JLO stack 200 may improve the functioning of the underlying hardware.

In the following, reference is made to FIG. 2 and the corresponding example JLO logic 300 in FIG. 3. The logical features of the JLO logic 300 may be implemented in various orders and combinations. For example, in a first implementation, one or more features may be omitted or reordered with respect to a second implementation. At the input layer 210 of the JLO stack 200, the JLO logic 300 may obtain historical job load data 212 and historical resource utilization tracking data 214 (310). The historical job load data 212 may include, for example, a total number of jobs loaded on the computing application within a time unit and a number of jobs concurrently executed by the computing application within the time unit. The historical resource utilization tracking data 214 may include, for example, the usage amount of individual computing resources such as memory within the time unit. In some implementations, the historical job load data 212 and the historical resource utilization tracking data 214 may be received via the communication interface (e.g., communication interfaces 612, discussed below) from data sources 211 such as computing application execution data files or database.

At the input layer 210, the JLO logic 300 may pre-process the historical job load data 212 and the historical resource utilization tracking data 214 (320). In some implementations, the pre-processing may treat missing value data and remove duplicate data for the historical job load data 212 and the historical resource utilization tracking data 214. Additionally, or alternatively, the pre-processing may aggregate the historical job load data 212 by a preconfigured time interval. For example, as illustrated in Table 1, the historical job load data may be aggregated as a total number of running jobs and pending jobs every five-minute interval.

TABLE 1

Aggregation of Historical Job Load Data

| Date | Time | Job Load | Running Jobs | Pending Jobs |
|---|---|---|---|---|
| January 2021 | 20:45 | 24 | 18 | 6 |
| January 2021 | 20:50 | 25 | 18 | 7 |
| January 2021 | 20:55 | 27 | 19 | 18 |
| . | . | . | . | . |
| . | . | . | . | . |
| . | . | . | . | . |
| January 2021 | 21:20 | 33 | 22 | 11 |
| January 2021 | 21:25 | 29 | 20 | 9 |
| January 2021 | 21:30 | 28 | 21 | 7 |

The JLO logic 300 then may, at the input layer 210, store the pre-processed historical job load data 216 and the pre-processed historical resource utilization tracking data 218 via a memory operation at the data staging layer 205. In some implementations, the pre-processed historical job load data 216 and the pre-processed historical resource utilization tracking data 218 may be indexed to speed up query processing.

At the configuration layer 220, the JLO logic 300 may determine an optimization interval 221 to monitor the job concurrency and the computing resource utilization to optimize the job load capacity for the computing application. For example, the optimization interval 221 may be predetermined to be periodical or non-periodical (e.g., hourly, six hours, daily, weekly, and monthly). Additionally or alternatively, the JLO logic 300 may receive the optimization interval 221 from the input of system operator via a user interface.

At the monitoring engine layer 250, the JLO logic 300 may analyze the pre-processed historical job load data 216 and the pre-processed historical resource utilization tracking data 218 to determine an optimal job load capacity for the computing application where both the optimal job concurrency and the optimal computing resource utilization are achieved.

The JLO logic 300 may predict a first performance metric for job load capacity of the computing application for optimal job concurrency and optimal resource utilization (330). In an implementation, the performance metric for the job load capacity may be formulated as a metric of overall economy rate (OER) $L_{OER}$ which may be represented by the Equation 1.

$$L_{OER} = P(L_C) \times L_{U/R} \quad \text{Equation 1}$$

Where $L_{U/R}$ represents a percentage value of computing resource utilization of the computing application. R represents a total amount of computing resources allocated to the computing application and U represents the computing resources used by the computing application.

$L_C$ represents the number of jobs being concurrently executed by the computing application within the pre-configured time interval.

$P(L_C)$ is an effective value of job concurrency taking into account the penalty due to the cost of jobs pending for execution. $P(L_C)$ may be represented by the Equation 2.

$$P(L_C) = L_C - \left(L_C \times \frac{L_W}{L_T}\right) \quad \text{Equation 2}$$

Where $L_T$ represents the number of job load on the computing application, i.e., the job load capacity, within the pre-configured time interval. The job load may include both jobs being concurrently executed by the computing application and jobs pending for execution by the computing application.

$L_W$ ($=L_T-L_C$) represents the number of jobs pending for execution by the computing application.

As indicated, the maximum value of the metric OER, i.e., Max ($L_{OER}$) may point to maxima of the tuple ($L_T$, $L_C$, $L_{U/R}$) for a given set of job load data and computing resource utilization tracking data during a specified time period. The maximum of the performance metric OER may indicate the optimal job load for the computing application where both the optimal job concurrency and the optimal resource utilization are achieved. Therefore, the first performance metric may be represented by the Max ($L_{OER}$) during a first time period.

In an implementation, the JLO logic 300 may measure a group of candidate performance metrics based on historical job load data and historical resource utilization tracking data generated during the first time period and select a candidate performance metric with a highest value among the group of candidate performance metrics as the first performance metric. For example, the JLO logic 300 may determine the number of jobs loaded on the computing application $L_T$ within a predetermined interval such as five minutes and the number of jobs being concurrently executed by the computing application $L_C$ within the predetermined interval based on the historical job load data. The jobs loaded on the computing application may include jobs being concurrently executed by the computing application and jobs pending for execution by the computing application. The JLO logic 300 may calculate the number of jobs pending for execution by the computing application $L_W$ within the predetermined interval from the number of jobs loaded on the computing application $L_T$ and the number of jobs being concurrently executed $L_C$. The JLO logic 300 may determine a percentage of resource utilization $L_U/R$ within the predetermined interval based on the historical resource utilization tracking data during the first time period. The JLO logic 300 may calculate a candidate performance metric $Lo_{ER}$ for the predetermined interval based on the number of jobs loaded on the computing application $L_T$, the number of jobs being concurrently executed $L_C$, the number of jobs pending for execution $L_W$, and the percentage of resource utilization $L_U/R$ during the predetermined interval. After obtaining the group of candidate performance metrics for individual time intervals, the JLO logic 300 may select a candidate performance metric with a highest value among the group of candidate performance metrics as the first performance metric. Without changing the amount of computing resources allocated for use by the computing application, a job load capacity corresponding to optimal job concurrency and optimal resource utilization may have a highest performance metric (OER) value among performance metrics for respective job load capacities.

Additionally or alternatively, the JLO 300 may predict the first performance metric by executing a performance metric prediction engine with the historical job load data and the historical resource utilization tracking data generated during the first time period as input. The performance metric prediction engine may include a machine learning model. The machine learning model may be trained with historical job load data and historical resource utilization tracking data generated during a specific time period prior to the first time period and the computed OERs corresponding to the specific time period as training data. In an example, the machine learning model may be a deep learning model implemented based on artificial neural network.

Table 2 illustratively lists a group of candidate performance metrics $L_{OER}$. In the table, it can be determined that the first performance metric Max ($L_{OER}$) is 60.8350 where the job load capacity of the computing application is 79, the job concurrency value, i.e., the number of jobs concurrently running is 70, and the percentage value of the resource utilization is 98.08%. As seen, although 70 is not the maximum job currency value and 98.08% is not the maximum resource utilization rate, the optimal job concurrency and the optimal resource utilization are achieved at the job load capacity of 79 where the resource utilization may meet a predetermined criteria such as a SLA compliance value while the computing application maintains a relatively highest job concurrency.

TABLE 2

Candidate performance metrics

| $L_T$ | $L_C$ | $L_{U/R}$ | $\frac{L_W}{L_T}$ | $P(L_C)$ | $L_{OER}$ |
|---|---|---|---|---|---|
| 1 | 1 | 48.96% | 0.0000 | 1.0000 | 0.4896 |
| 2 | 2 | 67.84% | 0.0000 | 2.0000 | 1.3568 |
| 3 | 3 | 98.96% | 0.0000 | 3.0000 | 2.9689 |
| 4 | 4 | 99.27% | 0.0000 | 4.0000 | 3.9710 |
| 5 | 5 | 98.29% | 0.0000 | 5.0000 | 4.9144 |
| 6 | 6 | 98.96% | 0.0000 | 6.0000 | 5.9378 |

TABLE 2-continued

Candidate performance metrics

| $L_T$ | $L_C$ | $L_{U/R}$ | $\frac{L_W}{L_T}$ | $P(L_C)$ | $L_{OER}$ |
|---|---|---|---|---|---|
| 7 | 7 | 98.60% | 0.0000 | 7.0000 | 6.9020 |
| 8 | 8 | 99.27% | 0.0000 | 8.0000 | 7.9419 |
| 9 | 9 | 99.22% | 0.0000 | 9.0000 | 8.9300 |
| 10 | 10 | 99.90% | 0.0000 | 10.0000 | 9.9896 |
| 11 | 11 | 100% | 0.0000 | 11.0000 | 11.0000 |
| 12 | 12 | 98.86% | 0.0000 | 12.0000 | 11.8631 |
| . | . | . | . | . | . |
| . | . | . | . | . | . |
| . | . | . | . | . | . |
| 77 | 66 | 94.29% | 0.1429 | 56.5714 | 53.3438 |
| 78 | 66 | 83.40% | 0.1538 | 55.8462 | 46.5771 |
| 79 | 70 | 98.08% | 0.1139 | 62.0253 | 60.8350 |
| 80 | 68 | 81.85% | 0.1500 | 57.8000 | 47.3073 |
| 81 | 46 | 94.09% | 0.4321 | 26.1235 | 24.5788 |
| 82 | 76.5 | 80.55% | 0.0671 | 71.3689 | 57.4875 |
| 83 | 69 | 76.14% | 0.1687 | 57.3614 | 43.6756 |
| . | . | . | . | . | . |
| . | . | . | . | . | . |
| . | . | . | . | . | . |
| 455 | 60 | 73.86% | 0.8681 | 7.9121 | 5.8438 |

Figure 3:
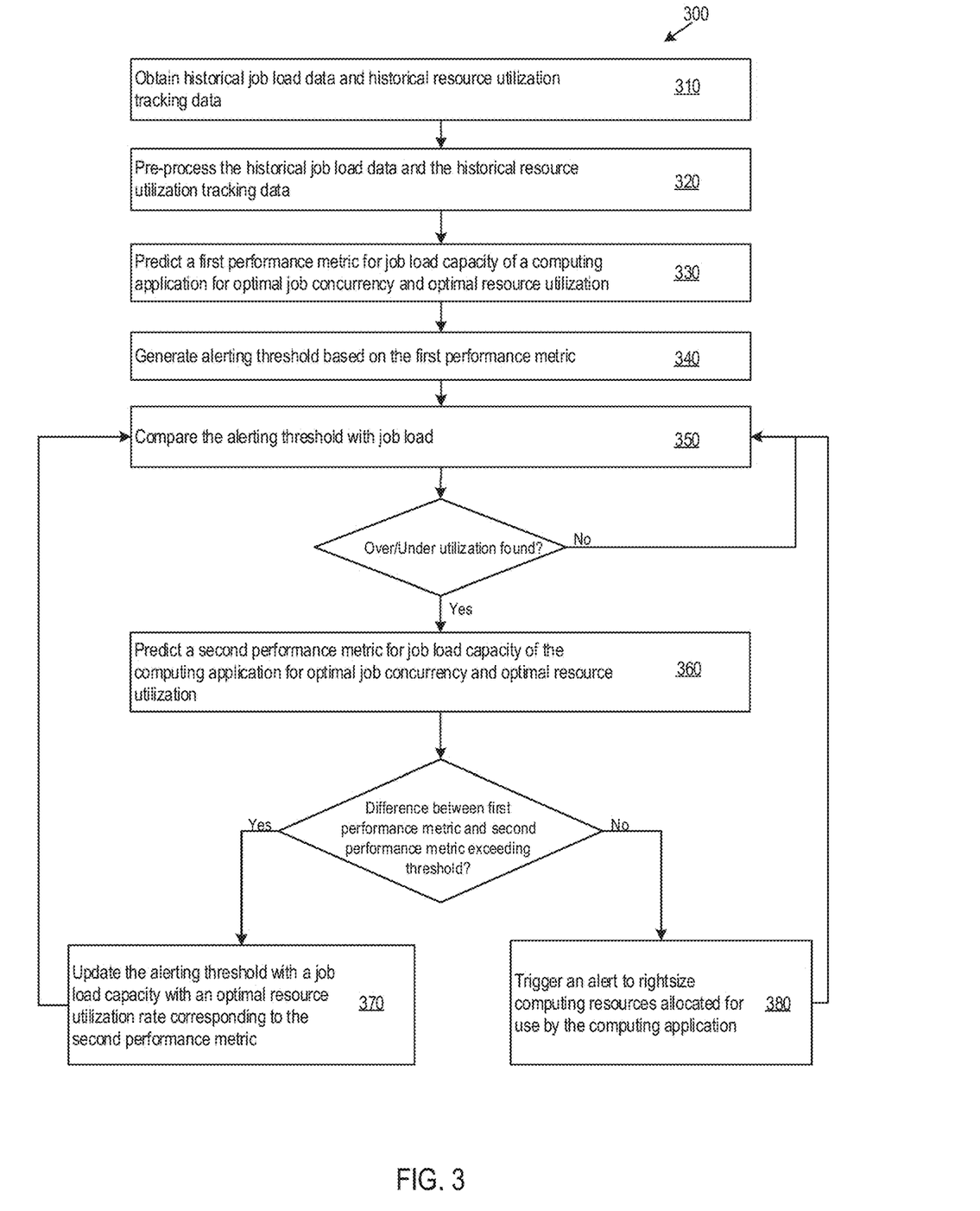
FIG. 3 shows an example job load optimization logic in accordance with an embodiment.

Referring to FIG. 3, the JLO logic 300 may generate an alerting threshold based on the first performance metric (340). The alerting threshold may represent a job load capacity with the optimal resource utilization rate corresponding to the first performance metric. For example, the JLO logic 300 may set the alerting threshold to be the job load capacity value $L_T$ corresponding to the first performance metric, i.e., 79 with the optimal resource utilization 98.08%.

Then, the JLO logic 300 may keep monitoring the job load change of the computing application by comparing the job load of the computing application within a time period with the alerting threshold (350). Where a difference between the alerting threshold and the job load of the computing application within the time period exceeds a load difference threshold, the JLO logic 300 may predict a second performance metric for job load capacity of the computing application for optimal job concurrency and optimal resource utilization based on historical job load data and historical resource utilization tracking data generated during a second time period (360). The second time period may for example refer to the period after the alerting threshold is generated. In other words, the JLO logic 300 may predict the second performance metric based on the historical job load data and the historical resource utilization tracking data generated after the generation of the alerting threshold. Additionally or alternatively, the second time period may refer to the period after the prediction of the first performance metric.

Here, the first performance metric and the second performance metric may refer to the maximum values of the metric OER of the computing application during different time period. In an example, the first time period is September during which the historical job load data and the historical resource utilization tracking data are generated for predicting the first performance metric while the second time period is October during which the historical job load data and the historical resource utilization tracking data are generated for predicting the second performance metric.

The JLO logic 300 may predict the second performance metric in the way similar to predicting the first performance metric as discussed above. In an implementation, the JLO logic 300 may measure a group of candidate performance metrics based on historical job load data and historical resource utilization tracking data generated during a second time period and select a candidate performance metric with a highest value among the group of candidate performance metrics as the second performance metric. For example, the JLO logic 300 may determine the number of jobs loaded on the computing application $L_T$ within a predetermined interval such as five minutes and the number of jobs being concurrently executed by the computing application $L_C$ within the predetermined interval based on the historical job load data generated during the second time period. The JLO logic 300 may calculate the number of jobs pending for execution by the computing application $L_W$ within the predetermined interval from the number of job loaded on the computing application $L_T$ and the number of jobs being concurrently executed $L_C$. The JLO logic 300 may determine a percentage of resource utilization $L_{U/R}$ within the predetermined interval based on the historical resource utilization tracking data. The JLO logic 300 may calculate a candidate performance metric $L_{OER}$ for the predetermined interval based on the number of jobs loaded on the computing application $L_T$, the number of jobs being concurrently executed $L_C$, the number of jobs pending for execution $L_W$, and the percentage of resource utilization $L_{U/R}$.

In some implementations, the JLO logic 300 may take into account the resource utilization rate of the computing application when determining whether to predict the second performance metric. In particular, where a difference between the alerting threshold and the job load of the computing application within the time period exceeds a load difference threshold, the JLO logic 300 may determine if a resource utilization rate of the computing application within the time period is greater than a utilization rate threshold, for example, the lower limit value of resource utilization as required by SLA. Where the resource utilization rate is greater than the utilization rate threshold, the JLO logic 300 may predict the second performance metric for job load capacity of the computing application for optimal job concurrency and optimal resource utilization in the way as discussed above.

After obtaining the group of candidate performance metrics for individual time intervals, the JLO logic 300 may select a candidate performance metric with a highest value among the group of candidate performance metrics as the second performance metric. In an implementation, prior to selecting the second performance metric, the JLO logic 300 may compare a percentage value of resource utilization corresponding to a candidate performance metric with a utilization threshold, for example, the lower limit value of resource utilization as required by SLA. Where the percentage value of the resource utilization is lower than the utilization threshold, the JLO logic 300 may remove the candidate performance metric out of the group of candidate performance metrics before selecting the second performance metric from the group of candidate performance metrics.

Alternatively or additionally, as predicting the first performance metric, the JLO 300 may predict the second performance metric by executing the performance metric prediction engine as discussed above with the historical job load data and the historical resource utilization tracking data generated during the second time period as input.

After predicting the second performance metric, the JLO logic 300 may compare the first performance metric with the second performance metric. Where a difference between the first performance metric and the second performance metric exceeds a predetermined difference threshold, it may suggest that the optimal job load capacity for the computing application has changed for some reasons, for example, the computing application is allocated additional computing resources. Now the optimal job load capacity may change from the job load capacity corresponding to the first performance metric to the job load capacity corresponding to the second performance metric. To reflect the change, the JLO logic 300 may update the alerting threshold with the job load capacity with the optimal resource utilization rate corresponding to the second performance metric (370).

Figure 4:
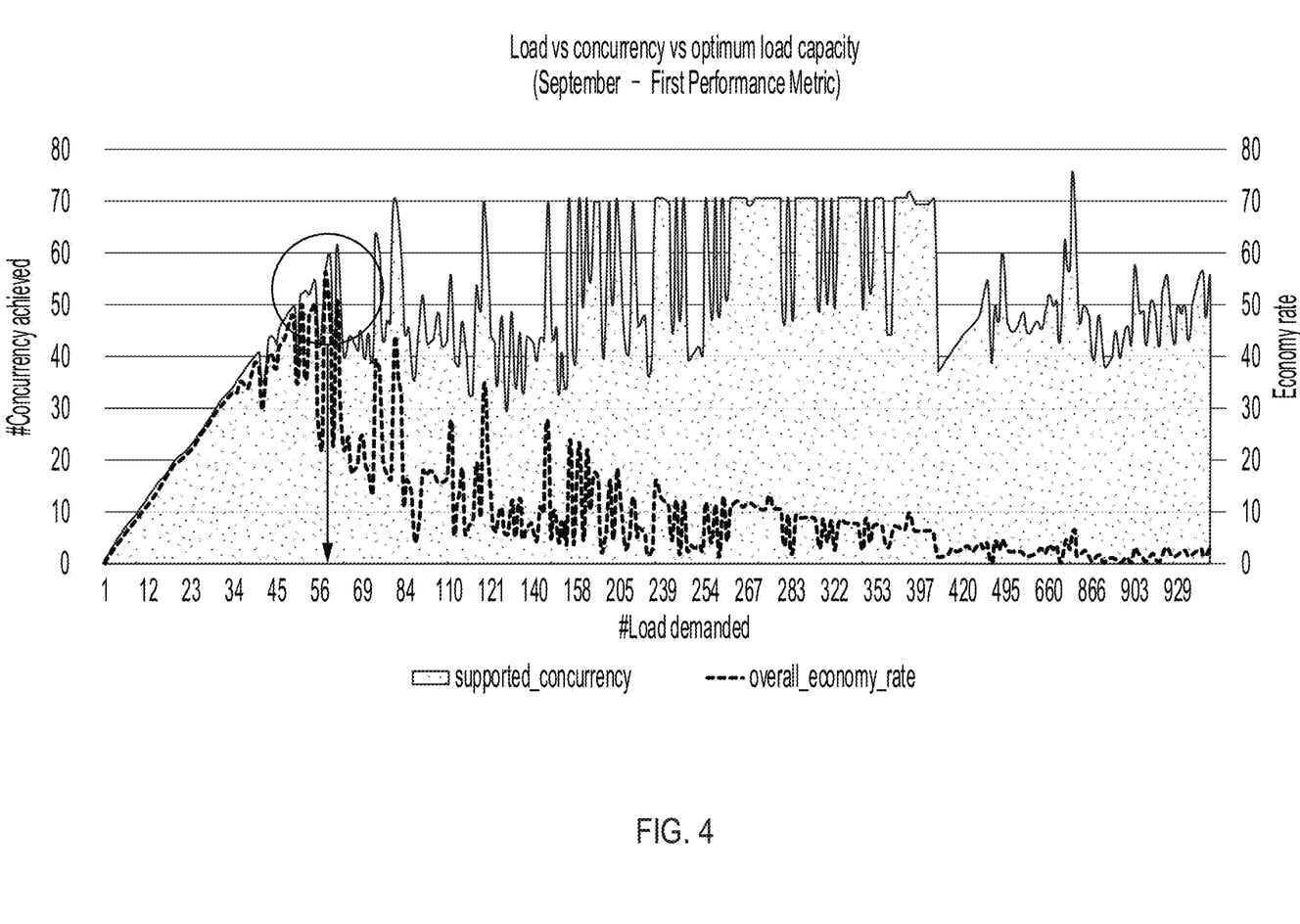
FIG. 4 is a chart schematically illustrating an example correlation of the job load, the job concurrency, and the performance metric overall economic rate for the computing application in accordance with an embodiment.
Figure 5:
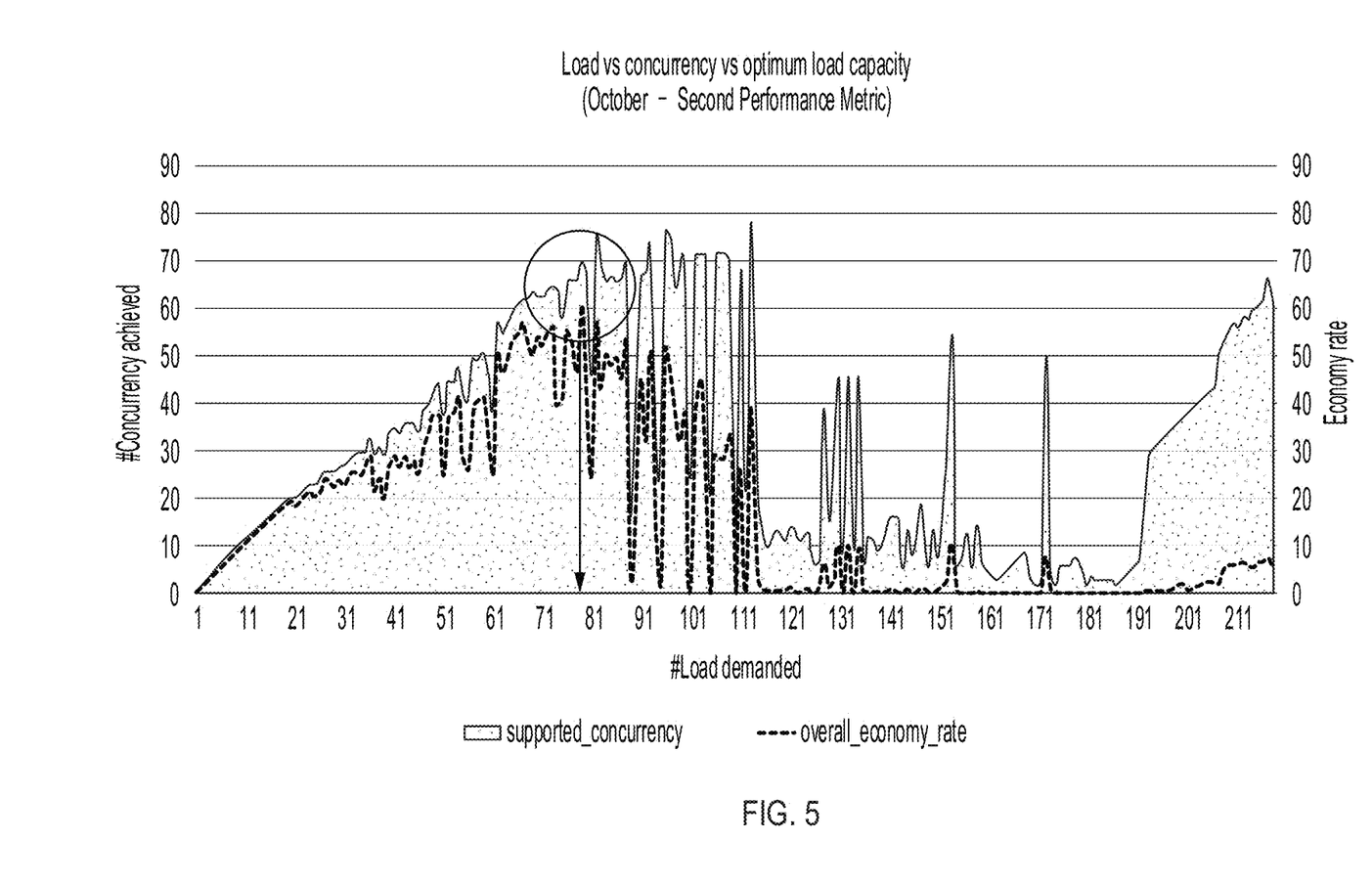
FIG. 5 is a chart schematically illustrating an example correlation of the job load, the job concurrency, and the performance metric overall economic rate for the computing application in accordance with an embodiment.

In an example with reference to FIGS. 4 and 5, FIG. 4 illustrates the correlation of the job load, the job concurrency, and the OER for the computing application in September. The first performance metric in this example may represent the maximum OER in September, which indicates that the number of the optimal job load capacity is 58 and the number of the optimal job concurrency is 58 in September. FIG. 5 illustrates the correlation of the job load, the job concurrency, and the OER for the computing application in October. The second performance metric in this example may represent the maximum OER in October, which indicates that the number of the optimal job load capacity is 79 and the number of the optimal job concurrency is 70 in October. Here, since the memory capacity allocated to the computing application is increased from September to October, the optimal job load capacity is increased from 58 to 79 accordingly.

On the other hand, where a difference between the first performance metric and the second performance metric does not exceed the predetermined difference threshold, it may suggest that the optimal job load capacity for the computing application does not change but the computing application has been continuously taking job load significantly more/less than the optimal job load capacity for the computing application. In this case, the JLO logic 300 may trigger an alert to rightsize computing resources allocated for use by the computing application (380). For example, if the job load of the computing application within a time period is greater than the alerting threshold by more than the load difference threshold and a resource utilization rate of the computing application within the time period being less than or equal to a utilization rate threshold, for example, the lower limit value of resource utilization as required by SLA, the JLO logic 300 may trigger to upsize the computing resources allocated for use by the computing application. Alternatively or additionally, the JLO logic 300 may recommend to decrease the job load of the computing application close to the alerting threshold using load balancing technique. In this way, the JLO logic 300 may eliminate the over-utilization performance issues by preventing over-loading, exceeding the load difference threshold, beyond the job load capacity with the optimal resource utilization rate.

If the job load of the computing application within a time period is less than the alerting threshold by more than the load difference threshold and a resource utilization rate of the computing application within the time period being less than or equal to a utilization rate threshold, for example, the lower limit value of resource utilization as required by SLA, the JLO logic 300 may trigger to downsize the computing resources allocated for use by the computing application. Alternatively or additionally, the JLO logic 300 may recommend to increase the job load of the computing application close to the alerting threshold using load balancing technique. In this way, the JLO logic 300 may eliminate the under-utilization performance issues by preventing under-loading, exceeding the load difference threshold, below the job load capacity with the optimal resource utilization rate.

Referring to FIG. 3, after updating the alerting threshold at step 370 or triggering an alert to rightsize the computing resources allocated for use by the computing application at step 380, the JLO logic 300 may iteratively perform the steps discussed above, including monitoring the job load change of the computing application, comparing the job load of the computing application with the alerting threshold, predicting a next performance metric for optimal job load capacity, comparing the next performance metric with the previous performance metric, and updating the alerting threshold or triggering an alert to rightsize the computing resources based on the performance metric comparison result. In the new iteration, the original second performance metric may serve as the new first performance metric while the next second performance metric may serve as the new second performance metric, and accordingly the performance metric comparison will be between the new first performance metric and the new second performance metric. In this way, the JLO logic 300 may continuously monitor and optimize the computing resource usage of the computing application to maintain the optimal job load concurrency and the optimal resource utilization rate for the computing application.

Figure 6:
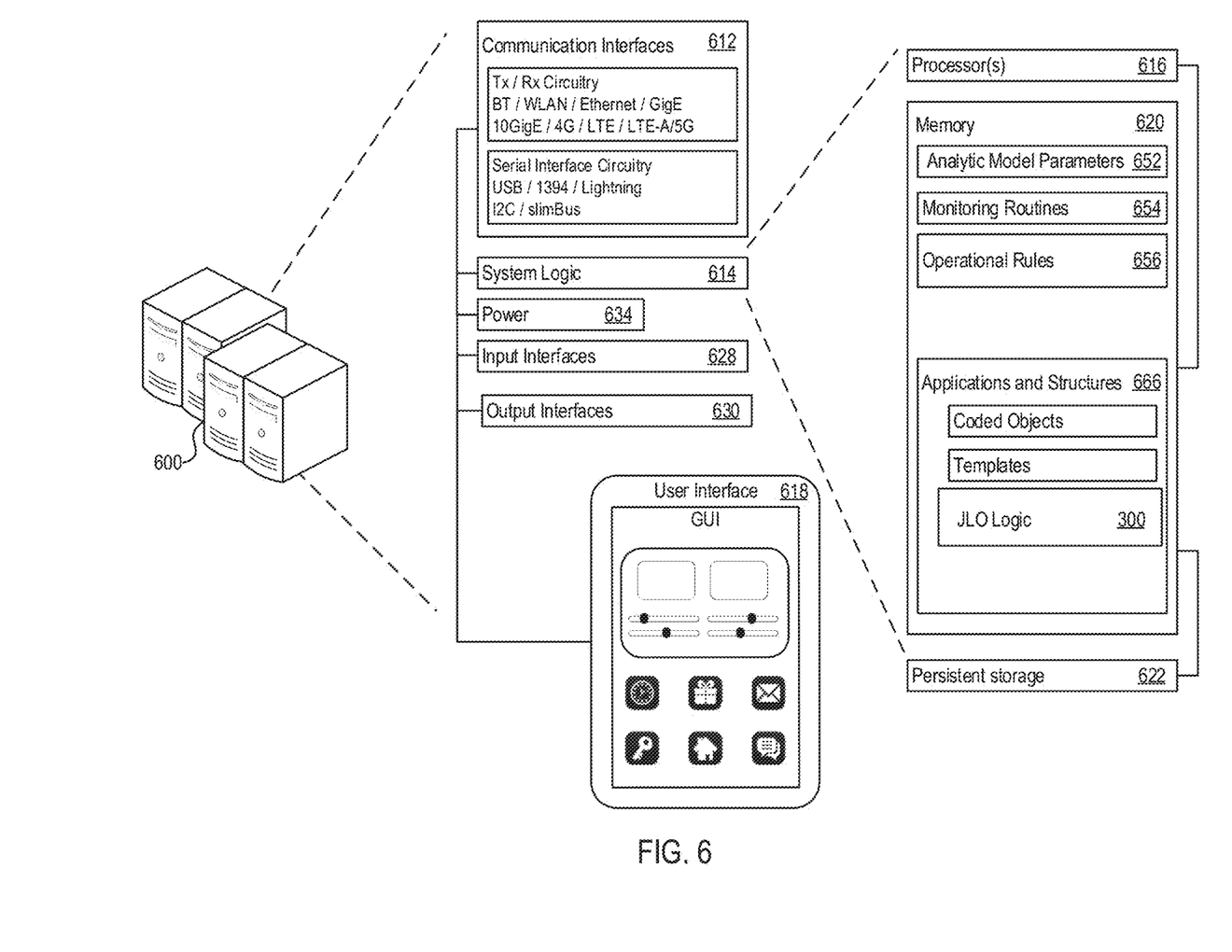
FIG. 6 shows an example system execution environment for a job load optimization stack.

FIG. 6 shows an example system execution environment 600 for the JLO stack 200 described above. The execution environment 600 may include system logic 614 to support execution of the multiple layers of JLO stack 200 described above. The system logic 614 may include processors 616, memory 620, persistent storage 622, and/or other circuitry.

The memory 620 may include analytic model parameters 652, monitoring routines 654, and operational rules 656. The memory 620 may further include applications and structures 666, for example, coded objects, machine instructions, templates, or other structures to support pre-processing the job load data and the resource utilization tracking data, predicting the first/second performance metrics for the job load capacity of the computing application for optimal job concurrency and optimal resource utilization, generating/update the alerting threshold, or other tasks described above. The applications and structures may implement the JLO logic 300. The persistent storage 622 may persist the pre-processed job load data, the pre-processed resource utilization tracking data, and the performance metrics for optimal job concurrency and optimal resource utilization in different time periods.

The execution environment 600 may also include communication interfaces 612, which may support wireless, e.g. Bluetooth, Wi-Fi, WLAN, cellular (4G, LTE/A, 5G), and/or wired, Ethernet, Gigabit Ethernet, optical networking protocols. The communication interfaces 612 may also include serial interfaces, such as universal serial bus (USB), serial ATA, IEEE 1394, lighting port, $I^2C$, slimBus, or other serial interfaces. The communication interfaces 612 may be used to support and/or implement remote operation of user interface. The execution environment 600 may include power functions 634, input interfaces 628, and output interfaces 630. The input interfaces 628 may transfer the input data and instructions to the execution environment 600. The output interfaces 630 may export the output data from the execution environment 600. For example, the output interfaces 630 may export a generated log to a disk storage.

The execution environment may also include a user interface 618 that may include human-to-machine interface devices and/or graphical user interfaces (GUI). The user interface 618 may be used to support and/or implement local operation of user interface. In various implementations, the system logic 614 may be distributed over one or more physical servers, be implemented as one or more virtual machines, be implemented in container environments such as Cloud Foundry or Docker, and/or be implemented in Serverless (functions as-a-Service) environments.

In some cases, the execution environment 600 may be a specially defined computational system deployed in a cloud platform. In some cases, the parameters defining the execution environment may be specified in a manifest for cloud deployment. The manifest may be used by an operator to requisition cloud based hardware resources, and then deploy the software components, for example, the JLO stack 200, of the execution environment onto the hardware resources. In some cases, a manifest may be stored as a preference file such as a YAML (yet another mark-up language), JSON, or other preference file type. Additionally or alternatively, the manifest may include custom scripts to implement the JLO stack 200 in a serverless environment.

The methods, devices, processing, circuitry, and logic described above may be implemented in many different ways and in many different combinations of hardware and software. For example, all or parts of the system, including the network interface circuitry and the optimization circuitry, may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible database service medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a database service medium and instructions stored in or on the medium, and the instructions when executed by the circuitry in a device may cause the device to implement any of the processing described above or illustrated in the drawings.

Implementations of the system may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include standalone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

What is claimed is:
1. A method comprising:
retrieving, with a processor circuitry, first historical job load data and first historical resource utilization data generated for a computing application during a first time period from a storage;
inputting, with the processor circuitry, the first historical job load data and first historical resource utilization data into a performance metric prediction engine to predict a first performance metric for job load capacity of the computing application subsequent to the first time period,
the first performance metric combining job concurrency of the computing application with resource utilization rate of the computing application and representing a first balance of job concurrency of the computing application and resource utilization rate of the computing application,
the job load capacity being a combination of jobs being concurrently executed by the computing application and jobs pending for execution by the computing application,
the performance metric prediction engine comprising a machine learning model trained to predict a job load performance metric balancing job concurrency and resource utilization rate of a computing application;
generating, with the processor circuitry, an alerting threshold based on the first performance metric, the alerting threshold representing a job load capacity corresponding to the first performance metric;
in response to a difference between the alerting threshold and a job load of the computing application within an interval exceeding a load difference threshold,
retrieving, with a processor circuitry, second historical job load data and second historical resource utilization data generated for the computing application during a second time period subsequent to the first time period from the storage, and
inputting, with the processor circuitry, the second historical job load data and second historical resource utilization data into the performance metric prediction engine to predict a second performance metric for job load capacity of the computing application subsequent to the second time period, the second performance metric combining job concurrency of the computing application with resource utilization rate of the computing application and representing a second balance of job concurrency and resource utilization rate of the computing application; and
in response to a difference between the first performance metric and the second performance metric exceeding a predetermined difference threshold, updating the alerting threshold with a job load capacity corresponding to the second performance metric; and
adjusting computing resources allocated to the computing application or job load of the computing application based on the updated alerting threshold.
2. The method of claim 1, further comprising, without changing an amount of computing resources allocated for use by the computing application, identifying a job load capacity corresponding to a highest performance metric value among performance metrics for respective job load capacities.

3. The method of claim 1, wherein:
the second time period is a time period after generation of the alerting threshold.

4. The method of claim 1, further comprising:
in response to a difference between the second performance metric and the first performance metric not exceeding the predetermined difference threshold, triggering an alert to rightsize computing resources allocated for use by the computing application.

5. The method of claim 1, further comprising:
in response to the job load of the computing application within the interval being greater than the alerting threshold by more than the load difference threshold and a resource utilization rate of the computing application within the interval being less than or equal to a utilization rate threshold, triggering to upsize computing resources allocated for use by the computing application or recommending to decrease job load of the computing application close to the alerting threshold.

6. The method of claim 1, further comprising:
in response to the job load of the computing application within the interval being less than the alerting threshold by more than the load difference threshold and a resource utilization rate of the computing application within the interval is less than or equal to a utilization rate threshold, triggering to downsize computing resources allocated for use by the computing application or recommending to increase job load of the computing application close to the alerting threshold.

7. The method of claim 1, inputting the second historical job load data and the second historical resource utilization data into the performance metric prediction engine to predict the second performance metric comprises:
in response to the difference between the alerting threshold and the job load of the computing application within the interval exceeding the load difference threshold and a resource utilization rate of the computing application within the interval is greater than a utilization rate threshold, inputting the second historical job load data and the second historical resource utilization data into the performance metric prediction engine to predict the second performance metric for job load capacity of the computing application subsequent to the second time period.

8. A system, comprising:
a memory having stored thereon executable instructions;
a processor circuitry in communication with the memory, the processor circuitry when executing the instructions configured to:
obtain first historical job load data and first historical resource utilization data generated for a computing application during a first time period;
input the first historical job load data and first historical resource utilization data into a performance metric prediction engine to predict a first performance metric for job load capacity of the computing application subsequent to the first time period,
the first performance metric combining job concurrency of the computing application with resource utilization rate of the computing application and representing a first balance of job concurrency of the computing application and resource utilization rate of the computing application,
the job load capacity being a combination of jobs being concurrently executed by the computing application and jobs pending for execution by the computing application,
the performance metric prediction engine comprising a machine learning model trained to predict a job load performance metric balancing job concurrency and resource utilization rate of a computing application;
generate an alerting threshold based on the first performance metric, the alerting threshold representing a job load capacity corresponding to the first performance metric;
in response to a difference between the alerting threshold and a job load of the computing application within an interval exceeding a load difference threshold,
obtain second historical job load data and second historical resource utilization data generated for the computing application during a second time period subsequent to the first time period, and
input the second historical job load data and second historical resource utilization data into the performance metric prediction engine to predict a second performance metric for job load capacity of the computing application subsequent to the second time period, the second performance metric combining job concurrency of the computing application with resource utilization rate of the computing application and representing a second balance of job concurrency and resource utilization rate of the computing application;
in response to a difference between the first performance metric and the second performance metric exceeding a predetermined difference threshold, update the alerting threshold with a job load capacity corresponding to the second performance metric; and
adjust computing resources allocated to the computing application or job load of the computing application based on the updated alerting threshold.

9. The system of claim 8, wherein the processor circuitry when executing the instructions is further configured to, without changing an amount of computing resources allocated for use by the computing application, identify a job load capacity corresponding to a highest performance metric value among performance metrics for respective job load capacities.

10. The system of claim 8, wherein the processor circuitry when executing the instructions is further configured to:
in response to a difference between the second performance metric and the first performance metric not exceeding the predetermined difference threshold, trigger an alert to rightsize computing resources allocated for use by for the computing application.

11. The system of claim 8, wherein the processor circuitry when executing the instructions is further configured to:
in response to the job load of the computing application within the interval being greater than the alerting threshold by more than the load difference threshold and a resource utilization rate of the computing application within the interval being less than or equal to a utilization rate threshold, trigger to upsize computing resources allocated for use by the computing application or recommend to decrease job load of the computing application close to the alerting threshold.

12. The system of claim 8, wherein the processor circuitry when executing the instructions is further configured to:
in response to the job load of the computing application within the interval being less than the alerting threshold by more than the load difference threshold and a resource utilization rate of the computing application within the interval is less than or equal to a utilization rate threshold, trigger to downsize computing resources allocated for use by the computing application or recommend to increase job load of the computing application close to the alerting threshold.

13. The system of claim 8, wherein the processor circuitry when executing the instructions is configured to:
in response to the difference between the alerting threshold and the job load of the computing application within the interval exceeding the load difference threshold and a resource utilization rate of the computing application within the interval is greater than a utilization rate threshold, input the second historical job load data and the second historical resource utilization data into the performance metric prediction engine to predict the second performance.

14. A product including:
machine-readable media other than a transitory signal; and
instructions stored on the machine-readable media, the instructions configured to, when executed, cause a processor circuitry to:
obtain first historical job load data and first historical resource utilization data generated for a computing application during a first time period;
input the first historical job load data and first historical resource utilization data into a performance metric prediction engine to predict a first performance metric for job load capacity of the computing application subsequent to the first time period,
the first performance metric combining job concurrency of the computing application with resource utilization rate of the computing application and representing a first balance of job concurrency of the computing application and resource utilization rate of the computing application,
the job load capacity being a combination of jobs being concurrently executed by the computing application and jobs pending for execution by the computing application,
the performance metric prediction engine comprising a machine learning model trained to predict a job load performance metric balancing job concurrency and resource utilization rate of a computing application;
generate an alerting threshold based on the first performance metric, the alerting threshold representing a job load capacity corresponding to the first performance metric;
in response to a difference between the alerting threshold and a job load of the computing application within an interval exceeding a load difference threshold,
obtain second historical job load data and second historical resource utilization data generated for the computing application during a second time period subsequent to the first time period, and
input the second historical job load data and second historical resource utilization data into the performance metric prediction engine to predict a second performance metric for job load capacity of the computing application subsequent to the second time period, the second performance metric combining job concurrency of the computing application with resource utilization rate of the computing application and representing a second balance of job concurrency and resource utilization rate of the computing application;
in response to a difference between the first performance metric and the second performance metric exceeding a predetermined difference threshold, update the alerting threshold with a job load capacity corresponding to the second performance metric; and
adjust computing resources allocated to the computing application or job load of the computing application based on the updated alerting threshold.

* * * * *

UNITED STATES PATENT AND TRADEMARK OFFICE
CERTIFICATE OF CORRECTION

PATENT NO. : 12,050,939 B2
APPLICATION NO. : 17/395994
DATED : July 30, 2024
INVENTOR(S) : Murtuza Chitalwala, Anuruddha S. Khastgir and Jagaran Das

It is certified that error appears in the above-identified patent and that said Letters Patent is hereby corrected as shown below:

In the Claims

In Claim 10, Column 16, Line 51, delete "for" between "for use by" and "the computing application".

In Claim 13, Column 17, Line 17, insert -- metric for job load capacity of the computing application subsequent to the second time period -- after "second performance".

Signed and Sealed this
Tenth Day of December, 2024

Katherine Kelly Vidal
*Director of the United States Patent and Trademark Office*